(No Model.)   2 Sheets—Sheet 1.

C. KIPP.
DELIVERY CART.

No. 355,177.   Patented Dec. 28, 1886.

Witnesses:   Inventor:
Daniel F. Kressly   Charles Kipp,
David McKenna   PER J. G. Oplinger
　　　　　　　　　　Attorney.

(No Model.) 2 Sheets—Sheet 2.

C. KIPP.
DELIVERY CART.

No. 355,177. Patented Dec. 28, 1886.

Witnesses:
Daniel F. Kressly.
David McKenna.

Inventor:
Charles Kipp.
PER G. T. Oplinger.
Attorney.

UNITED STATES PATENT OFFICE.

CHARLES KIPP, OF LEHIGHTON, PENNSYLVANIA.

DELIVERY-CART.

SPECIFICATION forming part of Letters Patent No. 355,177, dated December 28, 1886.

Application filed August 25, 1886. Serial No. 211,776. (No model.)

*To all whom it may concern:*

Be it known that I, CHARLES KIPP, a citizen of the United States of America, residing at Lehighton, in the county of Carbon and State of Pennsylvania, have invented a certain new and useful Improvement in Butchers' Delivery-Carts, of which the following is a specification, reference being had therein to the accompanying drawings.

This invention relates to improvements in two-wheeled delivery-carts for dry-goods, butchers' or peddlers' use, and has for its object to so construct the cart that the person driving the same can readily get out of or into the cart without climbing, and can also have ready access to the cart.

The invention consists in the novel construction and arrangement of parts, hereinafter described, and particularly specified in the claims.

Figure 1:
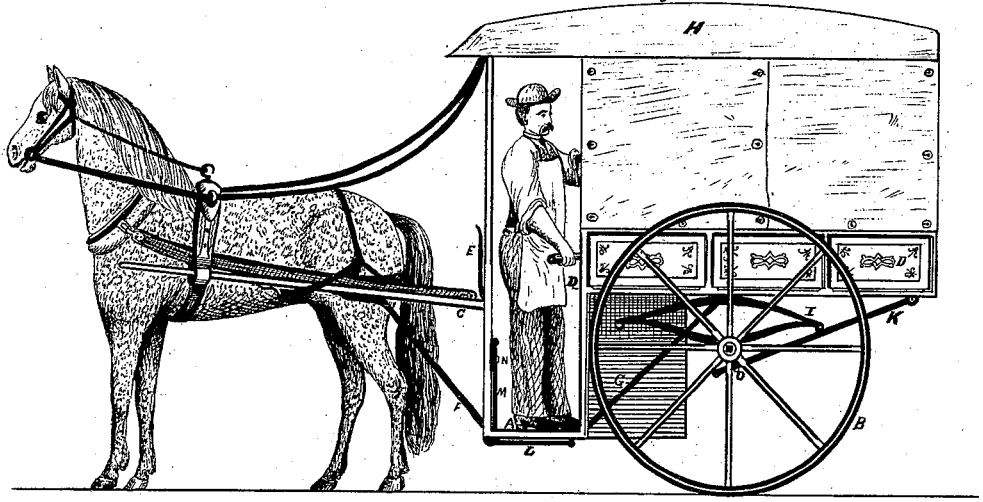
Figure 2:
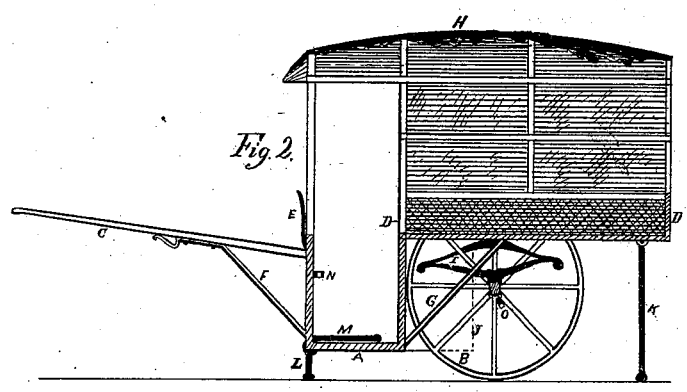
Figure 3:
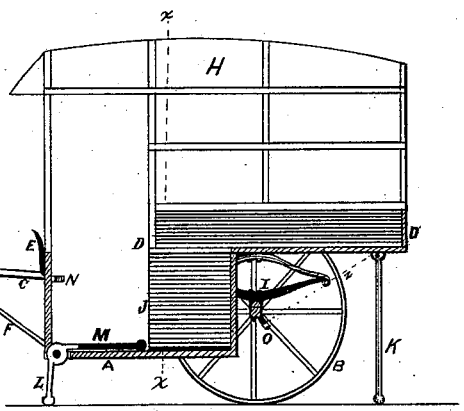
Figure 4:
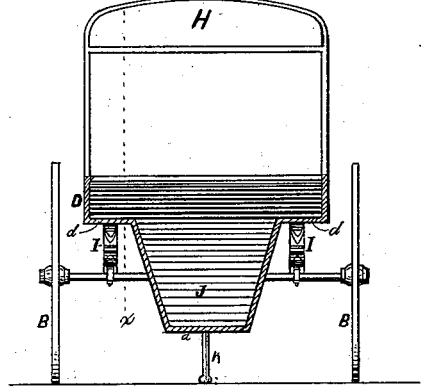
Figure 5:
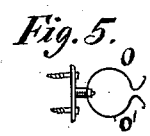

In the accompanying drawings, Figure 1 is a side elevation of the cart with horse and driver, as in use. Fig. 2 is a reduced vertical longitudinal section of the cart on line $x\,x$, Fig. 4, showing the supporting arms or legs adjusted for use. Fig. 3 is a view similar to Fig. 2, showing a modification of the body of the cart, taken on line $x\,x$, Fig. 3. Fig. 4 is a cross-section of the cart, taken on line $x\,x$, Fig. 3. Fig. 5 is a detail of the spring-retainers for the supporting-legs when the cart is in motion.

Referring to the drawings by letter, H designates the body of the cart, which resembles in form an ordinary ambulance or dayton, having, however, its front portion, A, depressed in front of the axle, so that the floor of this portion A is near the ground. The part D of the body in rear of portion A is made of wood, and has a covered top, which may be closed as desired, and the front portion, A, may also be provided with curtains or suitable means to protect the driver of the cart from the weather. The sides of portion A are open to permit ingress and egress of the occupant, and the front part is also opened at the top to permit proper direction of the horse drawing the cart, the lower front part of portion A being suitably closed and provided with a dash-board, E, as shown.

B B designate the supporting-wheels of the cart on a suitable axle situated about centrally of the cart, and secured to the bottom of the same by suitable springs, I I, as shown. I prefer having the wheels B B of large size, so as to relieve strain on the horse.

C designates the shafts, which are rigidly secured to the front portion of the cart, and strengthened by metal braces F, as shown.

G G designate braces, which extend from the rear lower part of portion A to the floor of the body proper.

J designates a closed extension of portion A, extending inward therefrom to within a short distance of the axle, and having converging sides, as shown, so as not to interfere with the braces G. This extension J permits the occupant of the cart to easily reach any article in the same, as is evident.

$d\,d$ represent the portions of the bottom of the body on the sides of the extension J, which may be used as shelves.

K designates a leg or rest hinged centrally to the rear of the cart, and adapted to be adjusted, as shown in Figs. 2 and 3, to support the body when the cart is at rest. When not in use, the leg K is swung up beneath the cart, as shown in Fig. 1, and held in that position by means of a spring-catch, O, (shown in Fig. 5,) secured to the axle. This spring-catch is formed of a circular open ring, $o$, having its ends bent outward to direct the end of leg K between them into the ring, and the ring is secured to a T-head having its arms perforated for the passage of fastening-screws, as shown.

L designates a bell-crank leg or rest, pivoted, through a suitable opening at its angle, centrally in the lower front end of portion A. By means of its inner arm, M, this rest can be raised or lowered, as shown in Fig. 1 or 2, for the purpose of supporting the cart when at rest. When the crank is turned up it is held so by means of a spring-catch similar to catch O, which engages the arm M of the crank, as shown.

It is obvious from the foregoing description that I provide a cart which is very convenient, durable, and light, and that by means of the rest L, which can be operated by the foot of the driver from the inside by means of its arm M, the horse can be relieved from the weight of the load when the driver wishes to leave the cart. It is also obvious that the driver, being enabled to stand upright in the cart, can work more readily and efficiently than where he is obliged to stoop or sit down.

I am aware that carts have been made having the front portion somewhat deepened, but not enough to permit the driver or occupant to stand upright in the cart and move about therein while the cart is in motion; and I am also aware that a rest or leg similar to leg K has been used, therefore I make no broad claim to these features; but What I do claim, and desire to secure by Letters Patent, is—

1. In a delivery-cart, the combination, with a main body supported upon one pair of wheels situated about centrally of its length, as described, of a deepened portion, A, having supporting-braces G and dash-board E, and an adjustable bell-crank, L, and catch N therefor, all substantially as and for the purpose specified.

2. A two-wheeled cart composed of the body H, having main part D and deepened front portion, A, closed converging part J, substantially as described, braces G, wheels B, shafts C, rigidly secured to the front portion, A, and braces F therefor, bell-crank rest L, adapted to be operated by the arm M, and rest K, and spring-catches O and N, for retaining the rests when not in use, all constructed and adapted to operate substantially in the manner and for the purpose specified.

CHARLES KIPP.

Witnesses:
DANIEL F. KRESSLY,
DAVID MCKENNA.